United States Patent
Fleming et al.

(10) Patent No.: US 8,640,291 B2
(45) Date of Patent: Feb. 4, 2014

(54) METHOD AND PRODUCT FOR MANUFACTURING VULCANIZED FOOTWEAR OR CUPSOLE FOOTWEAR

(75) Inventors: Vincent Fleming, Laguna Beach, CA (US); Aron Cabasan, Caloocan (PH); Lenny M. Holden, Trabuco Canyon, CA (US); Ronald E. Therrio, Silverado, CA (US)

(73) Assignee: Pierre Andre Senizergues

( * ) Notice: Subject to any disclaimer, the term of this patent is extended or adjusted under 35 U.S.C. 154(b) by 592 days.

(21) Appl. No.: 12/902,015

(22) Filed: Oct. 11, 2010

(65) Prior Publication Data

US 2011/0247236 A1      Oct. 13, 2011

Related U.S. Application Data

(63) Continuation-in-part of application No. 12/695,609, filed on Jan. 28, 2010, now abandoned.

(51) Int. Cl.
  *A43B 13/12*      (2006.01)

(52) U.S. Cl.
  USPC .......... 12/142 T; 12/142 RS; 36/25 R

(58) Field of Classification Search
  USPC ......... 12/142 RS, 142 T; 36/25 R, 30 R, 32 R
  See application file for complete search history.

(56) References Cited

U.S. PATENT DOCUMENTS

| | | | | |
|---|---|---|---|---|
| 3,116,566 A | * | 1/1964 | Ferreira | 36/30 R |
| 3,812,604 A | * | 5/1974 | Sato | 36/14 |
| 3,965,517 A | * | 6/1976 | Auberry et al. | 12/142 RS |
| 4,245,406 A | * | 1/1981 | Landay et al. | 36/14 |
| 4,407,034 A | * | 10/1983 | Ralphs | 12/142 RS |
| 4,562,606 A | * | 1/1986 | Folschweiler | 12/142 RS |
| 4,562,651 A |  | 1/1986 | Frederick et al. | |
| 4,651,444 A | * | 3/1987 | Ours | 36/93 |
| 4,922,630 A |  | 5/1990 | Robinson | |
| D313,113 S |  | 12/1990 | Aveni | |
| D316,626 S |  | 5/1991 | Hatfield | |
| D323,059 S |  | 1/1992 | Hatfield | |
| D329,940 S |  | 10/1992 | Hatfield | |
| D341,709 S |  | 11/1993 | Hatfield et al. | |
| 5,285,546 A | * | 2/1994 | Haimerl | 12/142 E |
| 5,435,959 A |  | 7/1995 | Williamson et al. | |
| 5,580,507 A |  | 12/1996 | Williamson et al. | |
| 5,709,954 A |  | 1/1998 | Lyden et al. | |
| 5,727,271 A | * | 3/1998 | Romanato et al. | 12/142 RS |
| 5,786,057 A |  | 7/1998 | Lyden et al. | |
| 5,843,268 A |  | 12/1998 | Lyden et al. | |

(Continued)

OTHER PUBLICATIONS

Nike Bratta Shoe (photograph).

*Primary Examiner* — Marie Patterson
(74) *Attorney, Agent, or Firm* — Stetina Brunda Garred & Brucker

(57) ABSTRACT

A vulc style and cupsole style footwear and a method for manufacturing the footwear are disclosed. The footwear includes a midsole that is directly attached to the upper. The midsole may be attached to the outsole by adhesive. In the method of manufacturing the footwear, the upper and an outsole are disposed a set distance apart. Polyurethane or other material for providing cushioning to the footwear is either injected between the upper and outsole or poured onto the outsole and the upper is traversed over the outsole so as to define the mold for defining the midsole. The polyurethane is directly attached to the upper and adhered to the outsole/cupsole.

14 Claims, 19 Drawing Sheets

(56) References Cited

U.S. PATENT DOCUMENTS

| | | |
|---|---|---|
| 5,906,872 A | 5/1999 | Lyden et al. |
| 6,540,864 B1 * | 4/2003 | Chi .............................. 156/245 |
| 6,676,782 B2 * | 1/2004 | Chi .............................. 156/79 |
| 7,033,458 B2 | 4/2006 | Chang et al. |
| 7,229,518 B1 | 6/2007 | Watkins |
| 2004/0143995 A1 * | 7/2004 | McClelland .................. 36/30 R |
| 2007/0227038 A1 | 10/2007 | Edington et al. |
| 2007/0227040 A1 | 10/2007 | Kilgore et al. |
| 2008/0193774 A1 | 8/2008 | Stone et al. |
| 2008/0196277 A1 | 8/2008 | Cook et al. |

* cited by examiner

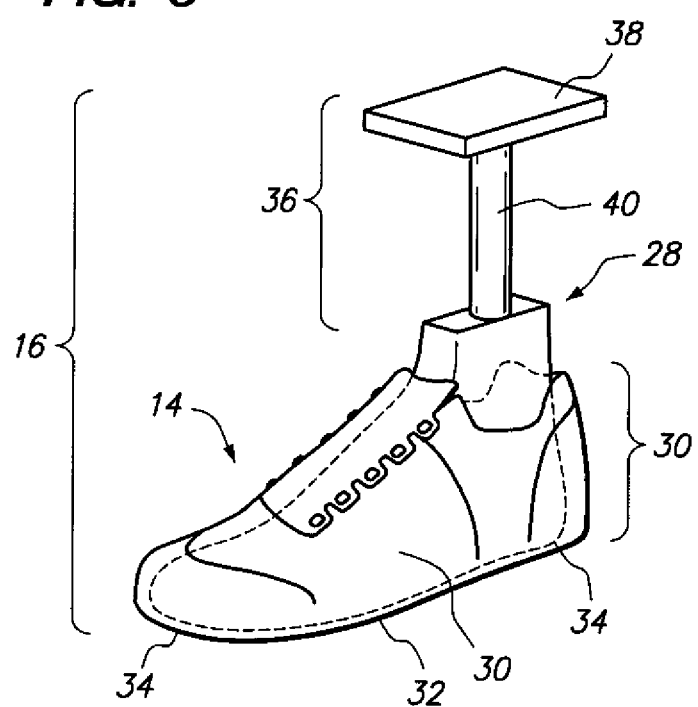

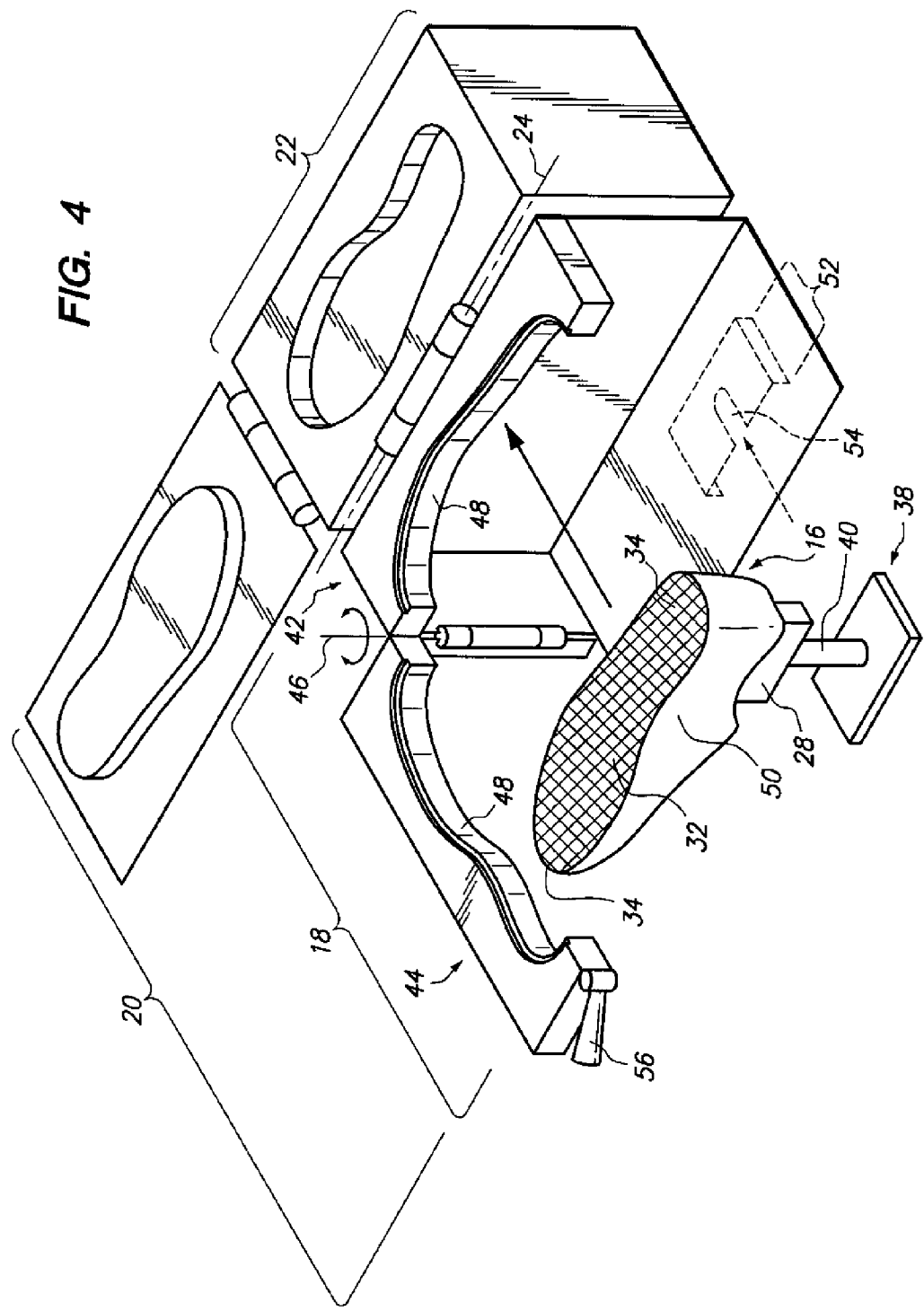

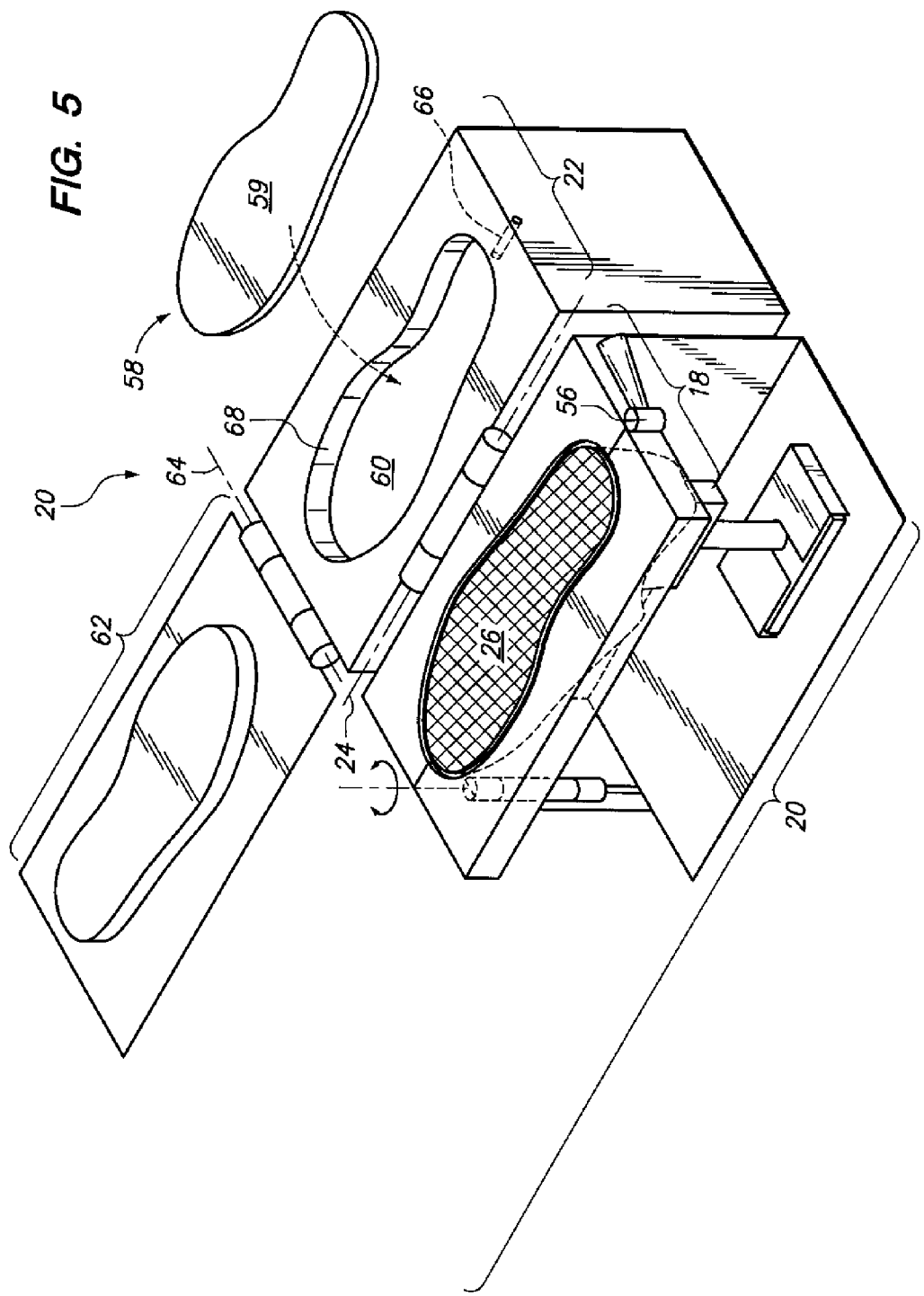

METHOD AND PRODUCT FOR MANUFACTURING VULCANIZED FOOTWEAR OR CUPSOLE FOOTWEAR

CROSS-REFERENCE TO RELATED APPLICATIONS

This application is a continuation in part application of U.S. patent application Ser. No. 12/695,609, filed Jan. 28, 2010 now abandoned, the entire contents of which are expressly incorporated herein by reference.

STATEMENT RE: FEDERALLY SPONSORED RESEARCH/DEVELOPMENT

Not Applicable

BACKGROUND

The present invention relates to a method and product for manufacturing vulcanized style footwear or cupsole style footwear.

FIG. 1 illustrates a flow chart for manufacturing a traditional vulc style footwear. Initially, the outsoles and midsoles of the footwear are formed separately in two different molds and possibly at two different locations or two different areas within a production plant. After the outsoles and midsoles are formed, they are brought together and assembled by disposing the midsole on the outsole. A lasted upper is disposed on the assembled outsole/midsole. Also, an uncured foxing is wrapped about the upper and the outsole by hand. Adhesive is applied on the interconnecting surfaces so that upon application of heat and pressure, the foxing attaches the upper to the outsole. The foxing is the member that joins the upper to the outsole. The foxing is vulcanized to the upper and the outsole to hold the shoe together. The primary purpose of the midsole is to provide cushioning and does not provide significant structural attachment between the upper and the outsole. This process is a hand intensive process, requires multiple steps and the transportation of the outsole and midsole over great distances when setting up a manufacturing plant to do high volume production of footwear. Alternatively, the outsole can be attached to the upper by way of the foxing. The midsole may be inserted into the upper and onto the upper surface of the outsole.

Referring now to FIG. 2, a flow chart for forming a cupsole style footwear is shown. In particular, the cupsole and the midsoles are formed separately. After the cupsoles and midsoles are formed, they are brought together and attached to each other. A lasted upper is placed (i.e., matched) on the midsole so that a cement line may be drawn on the upper. The area below the cement line is where adhesive or cement is placed on the upper to adhere the lip of the cupsole to the upper. After the cement line is drawn, the upper is removed from the cupsole. Cement is applied to the upper below the cement line. The lasted upper is then rematched onto the cupsole. Pressure and heat are applied until the cupsole is cured and attached to the upper so as to produce the shoe. Once again, the midsole does not structurally attach the upper to the cupsole or hold the shoe together.

Other methods of fabricating the midsole are also known in the prior art. Unfortunately, the conventional midsoles may include ratholes or gaps between various components of the foxing, cupsole, outsole and upper. These gaps cause structural delamination of the various components of the shoe and also hinders force transfer between the foot and the outsole which may be crucial in various technical sports requiring tactile foot skill. Additionally, when the midsole is injection molded into the shoe, the midsole does not structurally attach the upper to the outsole or cupsole.

Accordingly, there is a need in the art for an improved vulc style shoe and cupsole style shoe as well as a method for manufacturing such shoes.

BRIEF SUMMARY

The product and method described herein address the needs discussed above, discussed below and those that are known in the art.

The footwear described herein has a midsole that is directly attached to an upper of the footwear. By way of example and not limitation, the midsole may be fused with or permeate a thin fabric material at a bottom of the upper. The midsole may also be fused with or permeate a lower peripheral portion of the upper. Moreover, the midsole may be substantially continuously attached to the bottom surface of the upper so that no gaps or rat holes are formed between the upper and the midsole. This provides for better anatomical fit and support, better force transfer from the foot to the outsole or cupsole of the footwear and a longer lasting sturdier footwear construction. The midsole may be adhered or otherwise attached to the outsole or cupsole.

Direct attachment of the midsole to the upper of the footwear also reduces manufacturing costs. In particular, the midsole provides structural stability to the shoe. The midsole joins the upper to the outsole or cupsole. In the process of manufacturing the midsole directly attached to the upper, an outsole or cupsole may be placed in a fixture. Adhesive may be lined on the exposed surface of the outsole or cupsole where the midsole is formed. Polyurethane may be disposed (e.g., poured or injected) on the outsole. As the polyurethane expands, the polyurethane is adhered to the outsole by way of adhesive. The polyurethane is directly bonded to the upper.

This process may be utilized both for vulc style footwear as well as cupsole style footwear. Additionally, the footwear may be formed by way of pouring polyurethane onto the outsole or cupsole or injecting polyurethane between the upper and the outsole/cupsole defining the mold of the midsole.

More particularly, a footwear is disclosed. The footwear may comprise an upper, a midsole and an outsole. The upper may define a bottom surface and an exterior shell. The midsole may be bonded to the bottom surface of the upper and a bottom peripheral portion of the exterior shell. The midsole may define a bottom surface. The outsole may be attached (e.g., adhered, interlocked, etc.) to the bottom surface of the midsole.

The midsole and the outsole may both be polyurethane. The polyurethane of the midsole may have a lower density compared to the polyurethane of the outsole so that the midsole provides cushioning and the outsole provide wear resistance. Also, foxing which provides wear resistance may be attached to the outer periphery of the outsole and the midsole.

The outsole may have a cupsole configuration. The midsole may be adhered to the interior surface of the cupsole and a lip of the cupsole may be adhered to the bottom peripheral portion of the upper.

The outsole for all of the embodiments discussed herein may be fabricated from rubber, polyurethane or thermoplastic such as thermoplastic rubber.

A method of manufacturing footwear is also disclosed. The method may comprise the steps of disposing an outsole or cupsole on a first plate wherein the outsole defines a top surface; disposing a lasted upper in a second plate wherein the second plate is traversable to a first position with respect to the first plate; disposing settable liquid on the top surface of the outsole; traversing the second plate to the first position with respect to the first plate so that a bottom surface of the lasted upper is adjacent to the settable liquid on an opposite side from the outsole, the top surface of the outsole and the bottom surface of the upper defines a mold for forming a midsole from the settable liquid; and curing the settable liquid to a solid state to bond the midsole to the bottom surface of the upper.

The method may further comprise the step of applying an adhesive to the upper surface of the outsole to adhere the midsole to the outsole.

The second plate discussed in relation to the method may also include first and second parts that clamp around the lasted upper when the first and second parts are in a closed position. In this regard, the method may further comprise the steps of first applying adhesive to a lip of the cupsole, second traversing the second plate to the first position so that the lip of the cupsole is positioned between the upper and the first and second parts, and third traversing the first and second parts to the closed position to apply pressure on the lip of the cupsole to the upper. The method may also further comprise the step of activating the applied adhesive with light or heat. The traversing step may include the step of rotating the first and second plates with respect to each other about a common pivot axis.

Another method of manufacturing footwear is also disclosed. The method may comprise the steps of disposing an outsole on a first plate wherein the outsole defines a top surface; disposing a lasted upper in a second plate wherein the second plate is traversable to a first position with respect to the first plate; traversing the second plate to the first position with respect to the first plate so that a bottom surface of the lasted upper is adjacent the outsole so as to define a mold for a midsole; injecting settable liquid between the bottom surface of the lasted upper and the outsole; curing the settable liquid to a solid state to form the midsole; and attaching the settable liquid to the upper and the outsole.

In another embodiment of a footwear, the same may comprise an upper defining a bottom surface and an exterior shell, a midsole attached to the upper, and a cupsole having a plurality of posts formed about at least a portion of a periphery of the cupsole wherein the midsole surrounds the posts for mechanically interlocking the midsole to the cupsole. The posts define opening through which the midsole when in liquid form proceeds through to mechanically interlock with the posts.

A width of the posts may be less than at least one of the upper and lower portions of the cupsole. Preferably, the width of the posts is less than both the upper and lower portions of the cupsole. Also, an exterior surface of the post may be recessed within an exterior surface of the periphery of the cupsole so that the midsole can surround the post for mechanical interlock.

The midsole may be fused to a lower peripheral portion of the upper and adhered to a lip of the cupsole. The midsole may be fused to an entire periphery of the lower peripheral portion of the upper. The midsole may be adhered to an interior surface of the cupsole. The midsole may be adhered to an entire periphery of the interior surface of the cupsole.

The cupsole may be a unitary part or a two part cupsole comprising an outsole and a precured foxing.

In another embodiment, a method of manufacturing footwear is disclosed. The method may comprise the steps of disposing an outsole on a first plate; disposing an upper in a second plate wherein the first and second plates are traversable between a closed position and an open position; disposing settable liquid on the top surface of the outsole; traversing the first and second plates to the closed position to define a mold for forming a midsole from the settable liquid; flowing the settable liquid through apertures formed in the outsole to surround posts that define the aperture for forming a mechanical interlock between the midsole and the outsole; and setting the settable liquid.

In the method, the outsole may be a cupsole. The cupsole may be a unitary part or have two parts including an outsole and pre-cured foxing. The settable liquid may be fused to a bottom surface of the upper and adhered to the interior surface of the outsole.

The method may further comprise the step of flowing the settable liquid between a lip of the outsole and a lower peripheral portion of the upper. The settable liquid may be flowed between an entire periphery of the lip of the outsole and the lower peripheral portion of the upper.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 3 is a perspective view of a lasted upper;

FIG. 4 is a perspective view of a fixture (e.g., PU or polyurethane mold) for receiving the lasted upper;

FIG. 5 is a perspective view of the fixture shown in FIG. 7 with the lasted upper received into the fixture;

DETAILED DESCRIPTION

Figure 6:
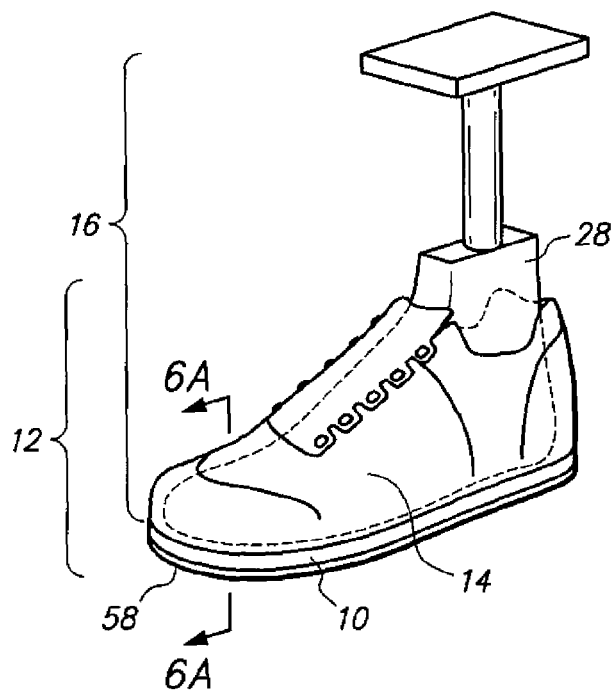
FIG. 6 is a perspective view of a footwear with a last disposed therein.
Figure 11:
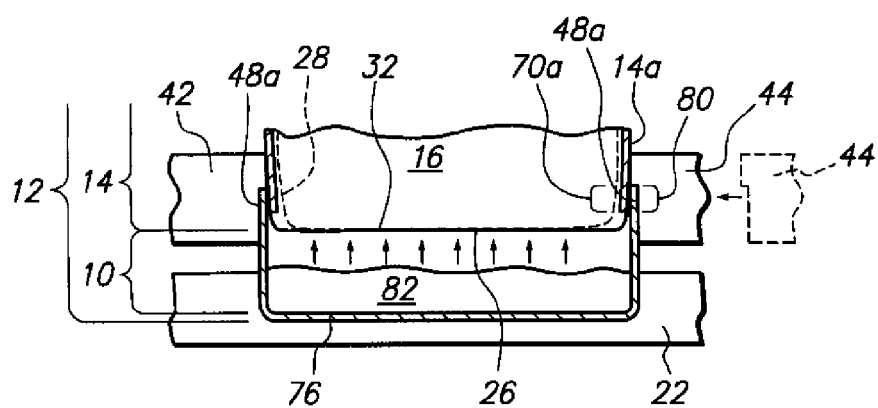
FIG. 11 is a cross sectional view of the fixture and footwear shown in FIG. 11 showing the application of pressure to a lip of the cupsole.

Referring now to FIGS. 6 and 11, a midsole 10 of a shoe 12 is directly attached to an upper 14. The direct attachment of the midsole 10 to the upper 14 provides for a sturdier shoe 12 having a better anatomical fit with the foot of the wearer for increased comfort and better lateral force support for specialized uses such as skateboarding. Negligible or no gaps (e.g., rat holes) are formed between the midsole 10 and the upper 14. Rather, the entire interface between the midsole 10 and the upper 14 is substantially if not entirely bonded to each other. Since the midsole 10 is bonded substantially or entirely to the bottom surface of the upper 14, lateral forces generated during performance of skateboard tricks are better able and more quickly transmitted to the board from the wearer's foot. Additionally, over a period of time, the substantial nonexistence of rat holes or gaps between the midsole 10 and the upper 14 mitigates delamination of the upper 14 from the midsole 10 and the outsole. These attributes provide for better lateral force support, increased comfort due to a better anatomical fit and sturdier long lasting footwear construction.

Moreover, the process of directly attaching the midsole 10 to the upper 14 reduces the hand assembly time and cost required to manufacture the shoe 12. In the process, a lasted upper 16 may be secured to a top plate 18 of a footwear fixture 20, as shown in FIG. 4. A predetermined quantity of polyurethane or other material may be poured (see FIG. 9) or injected into a bottom plate 22 of the footwear fixture 20. The polyurethane may be a low density polyurethane to provide for cushioning. Once a predetermined quantity of polyurethane is disposed in the bottom plate 22, the top plate 18 may be rotated about pivot axis 24 (see FIG. 4) so that the bottom surface 26 of the lasted upper 16 is now disposed above the polyurethane in the bottom plate 22 (see FIG. 4). The polyurethane may expand and contact the bottom surface 26 of the lasted upper 16. Upon curing of the polyurethane, the cured polyurethane which is now the midsole 10 of the footwear 12 is directly attached or bonded to the bottom surface 26 of the lasted upper 16 (see FIG. 6A), the polyurethane is fused into or permeated through the bottom surface 26 of the lasted upper 16. Hand assembly and thus cost is reduced compared to prior art methods. Also, quality is increased since this method reduces gaps.

The footwear described herein is in relation to a vulc style footwear and a cupsole style footwear. However, the various aspects of the footwear and methodology of manufacturing the footwear may be applied or employed to other types of footwear such as boots, slip-ons, sports shoes (e.g., football shoes, wrestling shoes, etc.). As such, the discussion of the footwear and methodology in relation to vulc style footwear and cupsole style footwear are for the purposes of convenience and not limitation. Additionally, the footwear and methodology described herein utilizes an outsole or cupsole for providing wear resistance with the ground. However, in certain shoes, the outsole or midsole may be eliminated.

More particularly, referring now to FIG. 3, a lasted upper 16 is shown. The lasted upper 16 refers to an upper 14 of the footwear 12 with a last 28 inserted into the upper 14. The upper 14 has an exterior shell 30 (see FIG. 3) which secures the foot of the wearer to the footwear 12. The upper 14 additionally has a thin fabric material 32 that extends across and is attached to the bottom peripheral edge 34 of the exterior shell 30 (see also FIG. 4). The polyurethane is fused into or permeates the thin fabric material 32. When the last 28 is inserted into the upper 14, the upper 14 is snuggly fitted against the last 28 so as to conform to the shape of the last 28. The last 28 may additionally have a rig 36 (see FIG. 3). The rig 36 has a plate 38 attached to a post 40. The plate 38 is at a predetermined distance from the thin fabric material 32 of the upper 14 so that the thin fabric material 32 defines a surface of the mold forming the shape of the midsole 10 or the polyurethane, as will be discussed further below.

Once the upper 14 is lasted, the lasted upper 16 is secured to the top plate 18, as shown in FIG. 4. In particular, the top plate 18 may have first and second parts 42, 44. The first and second parts 42, 44 may be pivoted about a pivot axis 46 to open the top plate 18 as shown in FIG. 4 or to close the top plate 18 as shown in FIG. 5. Referring back to FIG. 4, the first and second parts 42, 44 define an inner periphery 48 which matches the outer periphery 50 of the lasted upper 16. Additionally, the first part 42 may optionally have a sleeve 52 with a slot 54 sized and configured to receive the plate 38 and the post 40 of the lasted upper 16. When the plate 38 of the lasted upper 16 is inserted into the sleeve 52, the post 40 is received into the slot 54. Also, the outer periphery 50 of the lasted upper 16 is snuggly received against the inner periphery 48 of the first part 42. Once the lasted upper 16 is in position, the second part 44 may be rotated to the closed position as shown in FIG. 5 and locked by lock 56.

An outsole 58 (see FIG. 5) may be disposed in the cavity 60 of the bottom plate 22 or may be formed in the cavity 60. There are at least two different methods of disposing an outsole 58 on the bottom plate 22. By way of example and not limitation, an outsole 58 may be separately formed in a different mold. A plurality of outsoles 58 may be provided in a bin or other container to be used in the process described herein. Alternatively, the outsole 58 may be formed in place in the cavity 60 of the bottom plate 22. In particular, high density polyurethane may be poured into the cavity 60. Prior to setting of the polyurethane, a mid plate 62 may be rotated about axis 64 over the bottom plate 22. The mid plate 62 together with the bottom plate 22 defines the mold that forms the outsole 58. An injection molding process may also be utilized to form the outsole 58 in place on the bottom plate 22. In particular, the mid plate 62 may be rotated about axis 64 so as to be disposed on top of the bottom plate 22. High density polyurethane may be injected into the cavity 60 defined by the mid plate 62 and the bottom plate 22 through injection port 66. After the polyurethane is injected and cured, the mid plate 62 is rotated off of the bottom plate 22 thereby leaving the outsole 58 in the cavity 60 of the bottom plate 22. The polyurethane of the outsole is typically high density polyurethane for the purpose of providing wear resistance to the footwear.

Figure 6A:
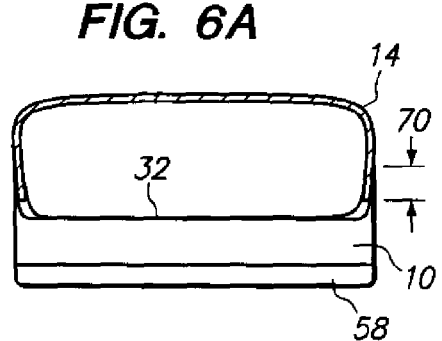
FIG. 6A is a cross sectional view of the footwear shown in FIG. 6.
Figure 7:
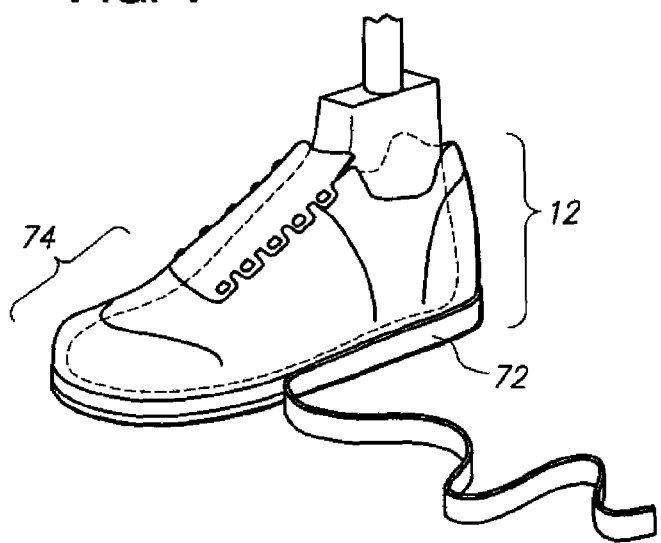
FIG. 7 illustrates foxing being wrapped around the footwear shown in FIG. 6.

After forming or disposing the outsole 58 in the cavity 60 of the bottom plate 22, a low density polyurethane for the purposes of providing cushioning to the footwear 12 may be poured onto the outsole 58. Prior to setting or curing of the polyurethane, the top plate 18 with the lasted upper 16 secured thereto is rotated about pivot axis 24 so that the bottom surface 26 of the lasted upper 16 is now above the curing polyurethane. The outsole 58, the bottom surface 26 of the lasted upper 16 and the walls 68 of the cavity 60 define the mold that forms the contour of the midsole 10. Prior to pouring of the polyurethane, an activatable adhesive may be applied (e.g., brushed, sprayed, etc.) to the exposed surface 59 (see FIG. 5) of the outsole 58. When the polyurethane is ready for pouring, the adhesive may be activated (e.g., flash, heat or the like). If the polyurethane is poured immediately after application of the adhesive, then an activatable adhesive is not required. Rather, a polyurethane reactive adhesive (PUR) is applied and a polyurethane is immediately poured over the outsole 58 onto the adhesive. Once the polyurethane is cured, the adhesive or PUR secures the cured polyurethane/midsole 10 to the outsole 58. The polyurethane or midsole 10 is bonded (e.g., permeated with or fused with) to the thin fabric material 32 of the upper 14 as well as a bottom peripheral edge portion 70 of the upper 14 as shown in FIG. 6A. The polyurethane or midsole 10 expands as it is cured and eventually fills the entire cavity and expands up alongside the bottom peripheral edge portion 70 of the upper 14 and is secured thereto. The footwear 12 may be removed from the footwear fixture 20 as shown in FIG. 6 which is ready to use. External embellishments may be added to the footwear 12 such as a foxing 72, as shown in FIG. 7. The foxing 72 may be pre-cured and adhered to the outsole 58 and the midsole 10. The foxing 72 may be wrapped around the entire footwear 12. Alternatively, the foxing 72 may be adhered to only the toe portion 74 of the footwear 12. In skateboarding, the toe portion 74 of the footwear 12 is utilized to manipulate the skateboard. The foxing 72 provides for extra wear pads to extend the life of the footwear 12.

Figure 1:
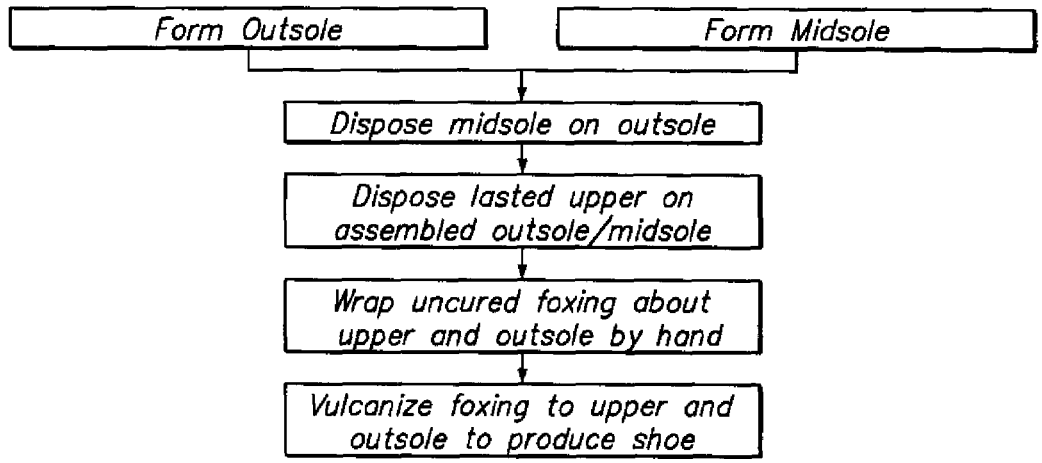
FIG. 1 is a flow chart of a prior art process for manufacturing a vulc shoe.
Figure 2:
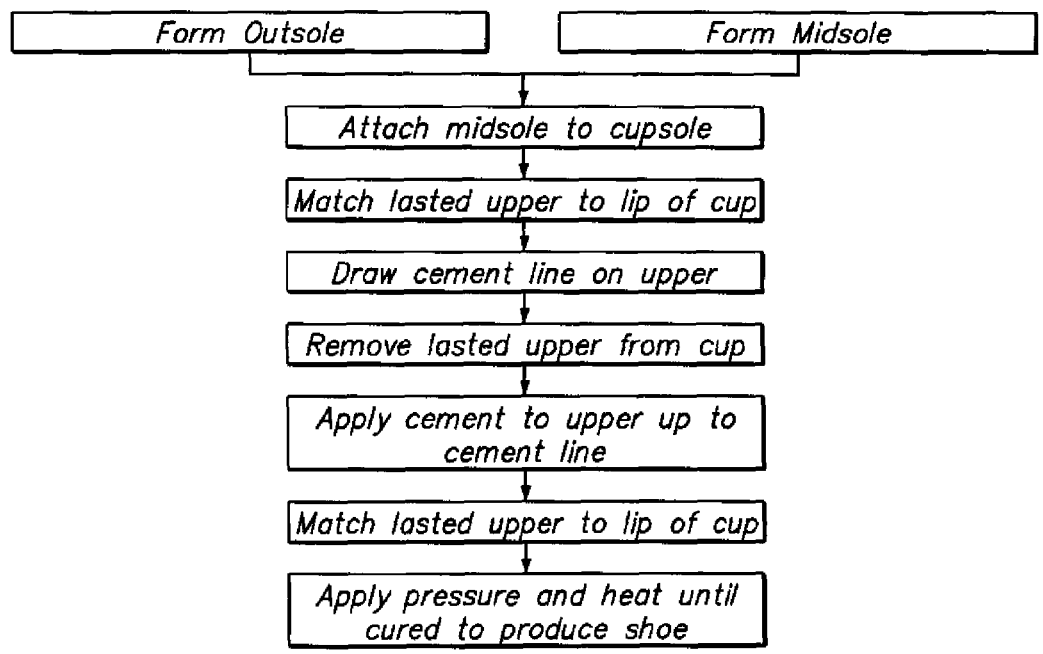
FIG. 2 is a flow chart of a prior art method for manufacturing a cupsole shoe.
Figure 4A:
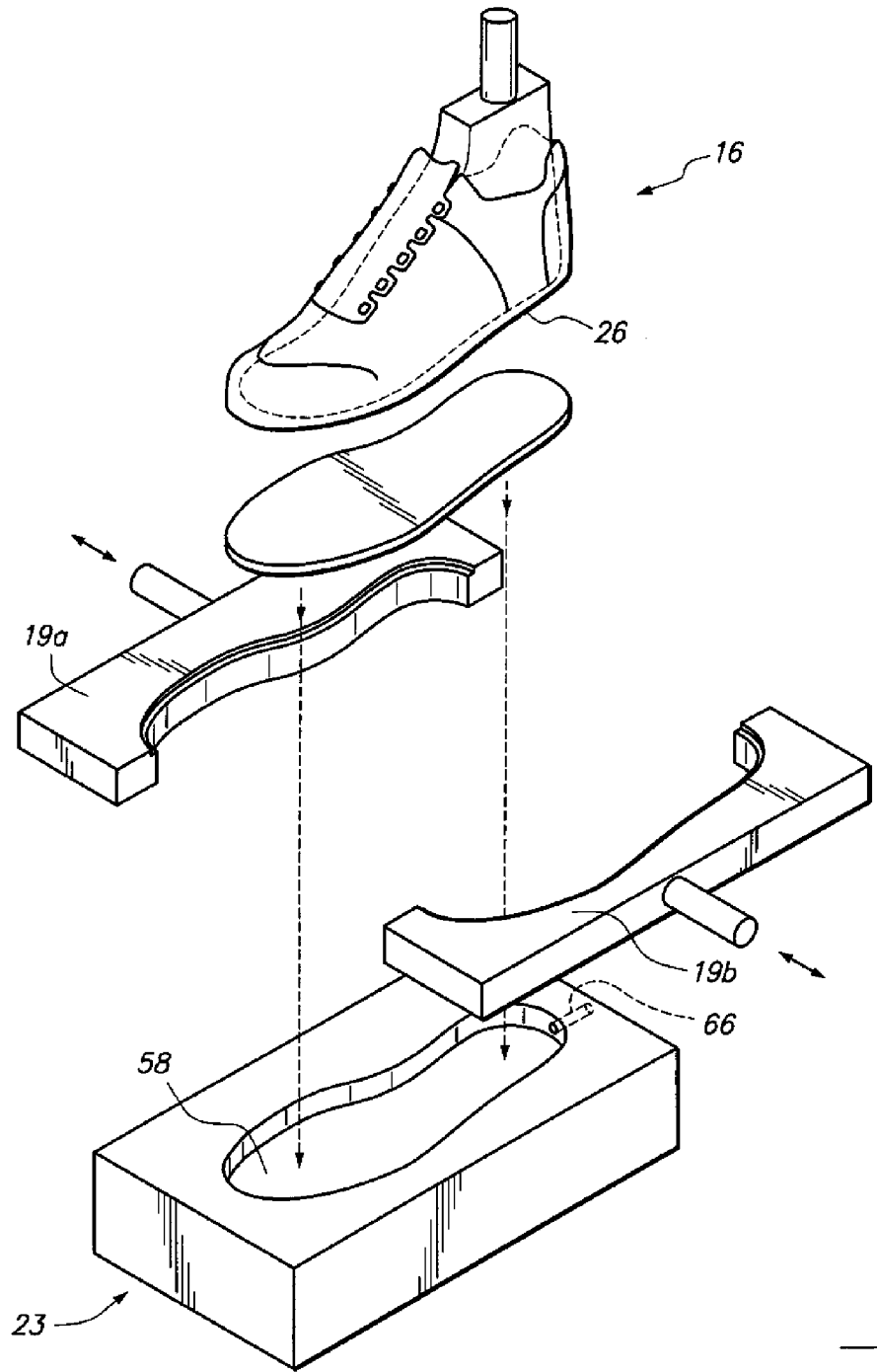
FIG. 4A is an illustration of an injection molding process for manufacturing a vulc style shoe.

Alternatively, after forming or disposing the outsole 58 in the cavity 60 of the bottom plate 22, a low density polyurethane may be injection molded to form the midsole 10, as shown in FIG. 4A. Prior to injection of the polyurethane, the lasted upper 16 is positioned above the outsole 58 and the bottom plate 23. The top plate 19a, b may be closed upon the lasted upper 16 so that the outsole 58, top plate 19a, b and the bottom surface 26 of the lasted upper 16 defines the mold for the midsole 10. Prior to movement of the lasted upper 16 and the top plate 19a, b, an activatable adhesive may be applied to the exposed surface of the outsole 58 which adheres the outsole 58 to the midsole 10. If the polyurethane is injected within a short period of time after application of the adhesive, then the adhesive does not need to be an activatable adhesive. Rather, the adhesive may be PUR. If a substantial amount of time is elapsed after application of the adhesive onto the outsole 58, then the adhesive should be an activatable adhesive. One that is activatable by heat or light. If the adhesive is an activatable adhesive, then prior to closing the top plate 18 above the outsole 58, the activatable adhesive is activated. The top plate 18 is closed on top of the outsole 58. Low density polyurethane is injected into the space between the bottom surface 26 of the lasted upper 16 and the outsole 58 by way of injection port 66. The polyurethane expands into the space and any air is out gassed through the thin fabric material 32. The polyurethane is directly attached (e.g., fused with the material 32 or permeated within the material 32) to the upper 14. Also, the polyurethane or midsole 10 is adhered to the outsole 58.

The activatable adhesive or PUR applied to the outsole 58 may cover the entire exposed surface of the outsole 58 or something less than the entire exposed surface of the outsole 58. By way of example and not limitation, the outer peripheral portion of the exposed surface of the outsole may be covered with adhesive or PUR for providing a peripheral seal between the midsole 10 and the outsole 58. Other patterns of adhesive or PUR coverage are also contemplated such as front/back, side to side, dotted, etc.

Figure 8:
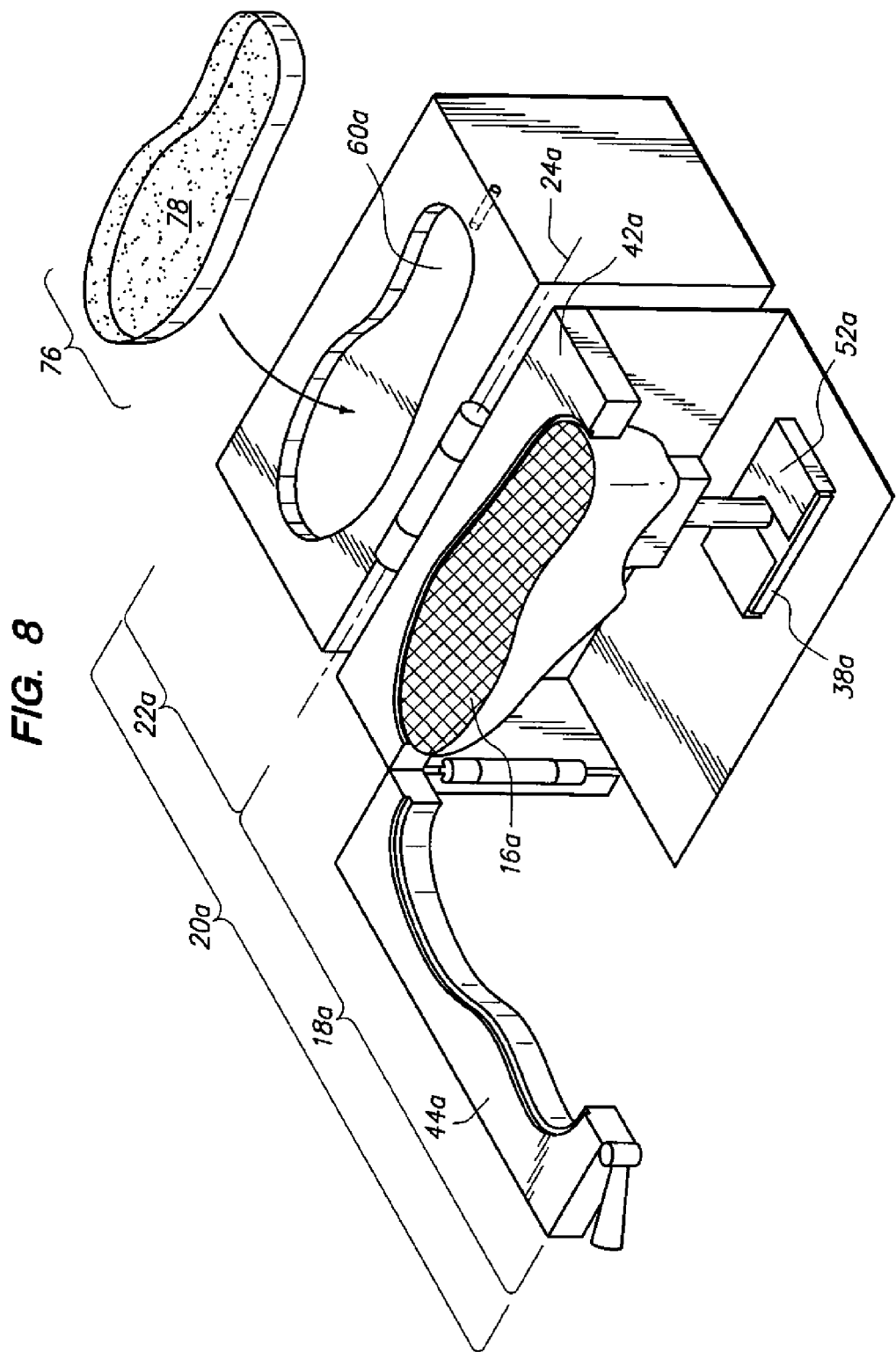
FIG. 8 is a perspective view of a fixture for fabricating a cupsole shoe.
Figure 9:
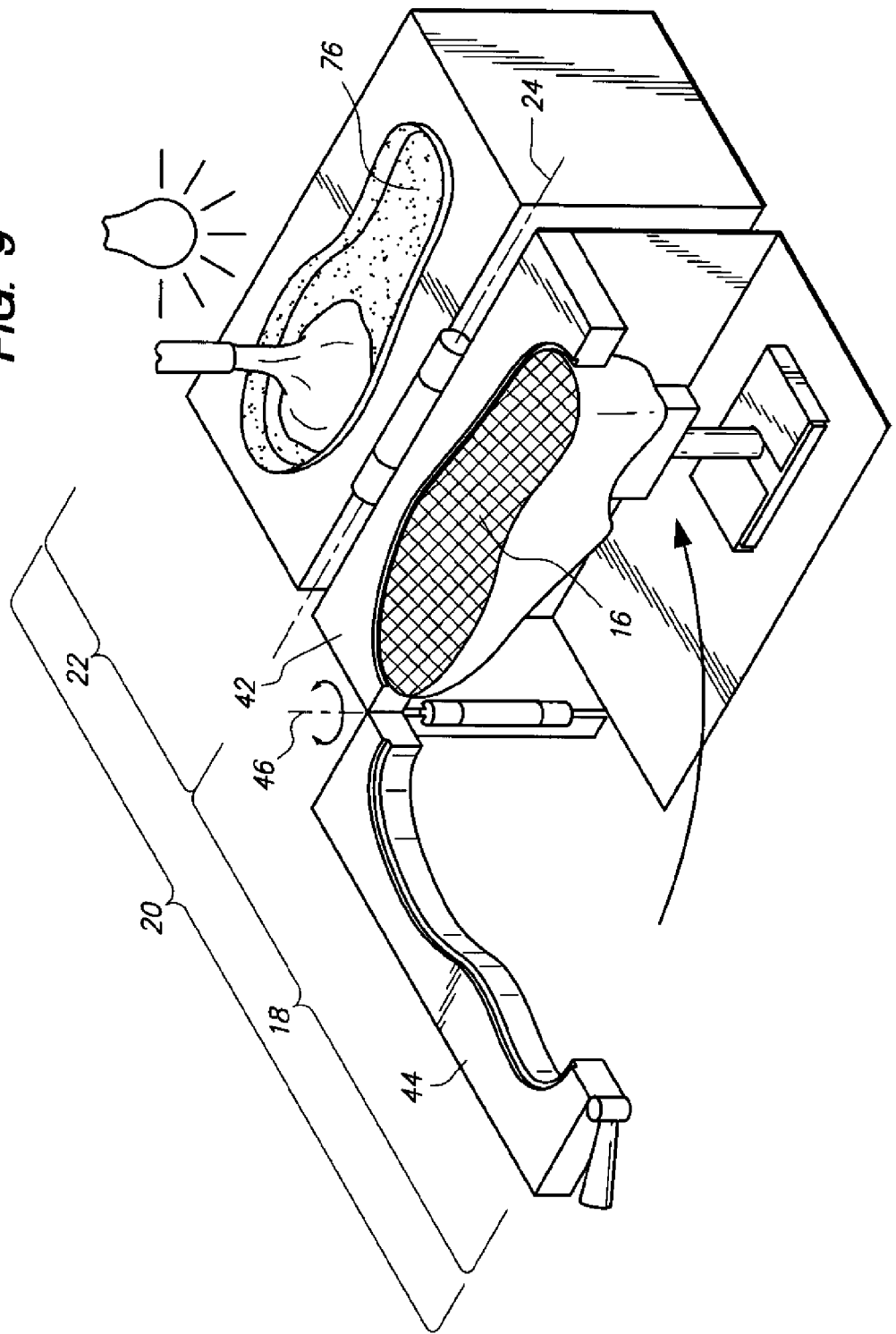
FIG. 9 illustrates a process of activating an adhesive by flash and pouring polyurethane into the cupsole.
Figure 10:
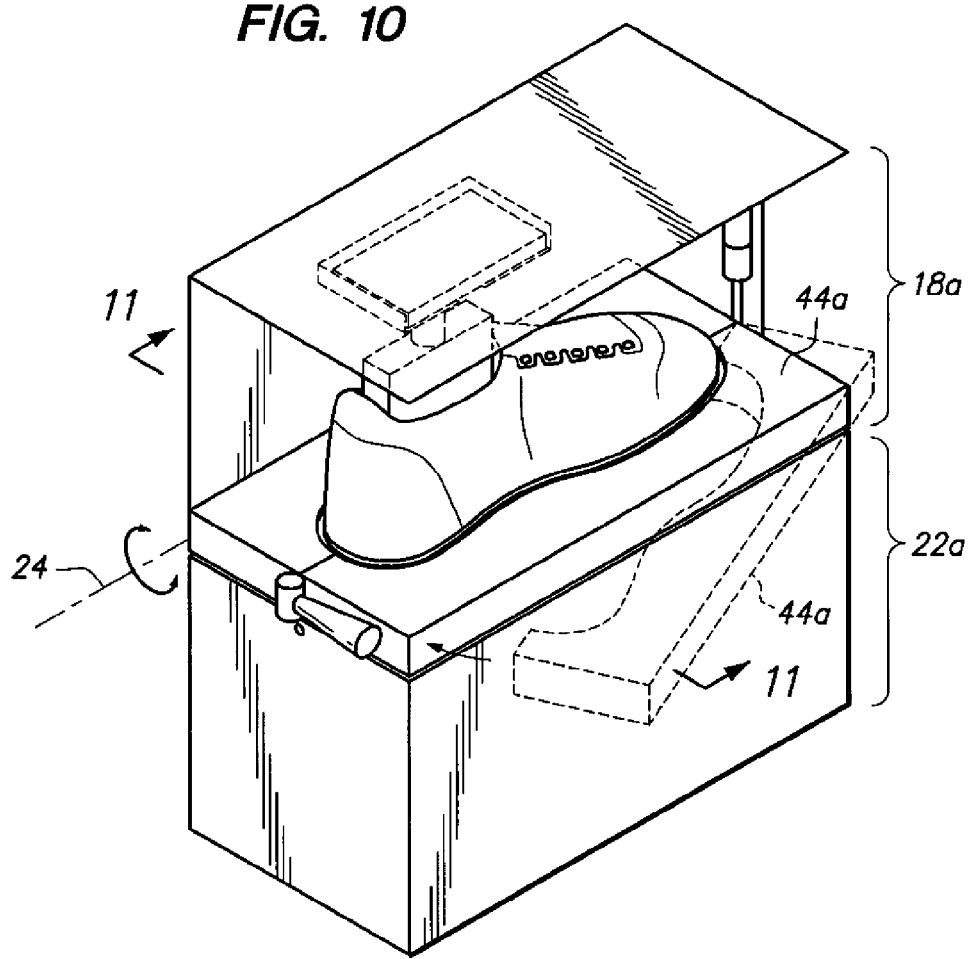
FIG. 10 illustrates the fixture and closing of the top plate to apply pressure to an outer periphery of the footwear.

Referring now to FIG. 8, a fixture 20a for manufacturing a cupsole footwear is shown. The fixture 20a may include a top plate 18a for positioning a lasted upper 16a and a bottom plate 22a. The top plate 18a may be rotated about axis 24a so that the top and bottom plates 18, 22 may be disposed one on top of the other. The bottom plate 22a may include a cavity 60a sized and configured to receive a cupsole 76. Similar to the prior embodiment, the lasted upper 16a may be mounted to the top plate 18a. Optionally, by way of example and not limitation, the plate 38a of the lasted upper 16 may be inserted into the sleeve 52 as shown in FIG. 8. Once the lasted upper 16a is in position with respect to the first part 42a, the second part 44a is not yet traversed to the closed position. The cupsole 76 is disposed within the cavity 60a, as shown in FIG. 9. Prior to pouring polyurethane into the cupsole 76, PUR or an activatable adhesive may be applied to the interior surface 78 of the cupsole 76, as shown in FIG. 8. The adhesive may be activated, polyurethane poured into the cupsole 76 (see FIG. 9) then the top plate 18a rotated about axis 24a onto the bottom part 22a, as shown in FIG. 10. If the polyurethane is poured immediately after application of the adhesive, then the adhesive does not need to be an activatable adhesive. Rather, PUR is applied to the interior surface 78 of the cupsole 76. The polyurethane is then immediately poured onto the PUR. After the top and bottom plates 18a, 22a are disposed on top of each other, the second part 44a is now traversed to the closed position and locked, as shown in FIG. 10. When the second part 44a is traversed to the closed position, the inner periphery 48a of the first and second parts 42a, 44a pushes against a lip 80 (see FIG. 11) of the cupsole 76 so that the adhesive may bond the lip 80 of the cupsole 76 to the bottom peripheral edge portions 70a of the upper 14. The polyurethane expands in the space between the cupsole 76 and the bottom surface 26 of the lasted upper 16. The gas between the surface 26 and the cupsole 76 may be gassed out of the thin fabric material 32 and the polyurethane fills the entire cavity 60 so that there are negligible or no rat holes or gaps therebetween.

Referring back to FIG. 8A, the cupsole 76 may also be fabricated in a two part form. In particular, the outsole 58a may be attached to a pre-cured foxing 72a prior to insertion in the bottom plate 22a. Additionally, the adhesive may be applied to an area less than the entire interior surface of the cupsole 76. Importantly, the adhesive or bonding agent should cover the interior surface of the lip 80 and the cupsole 76. The adhesive may cover more than the lip 80 of the cupsole 76 such as a peripheral portion, front to back, side to side, dotted, etc.

Figure 12:
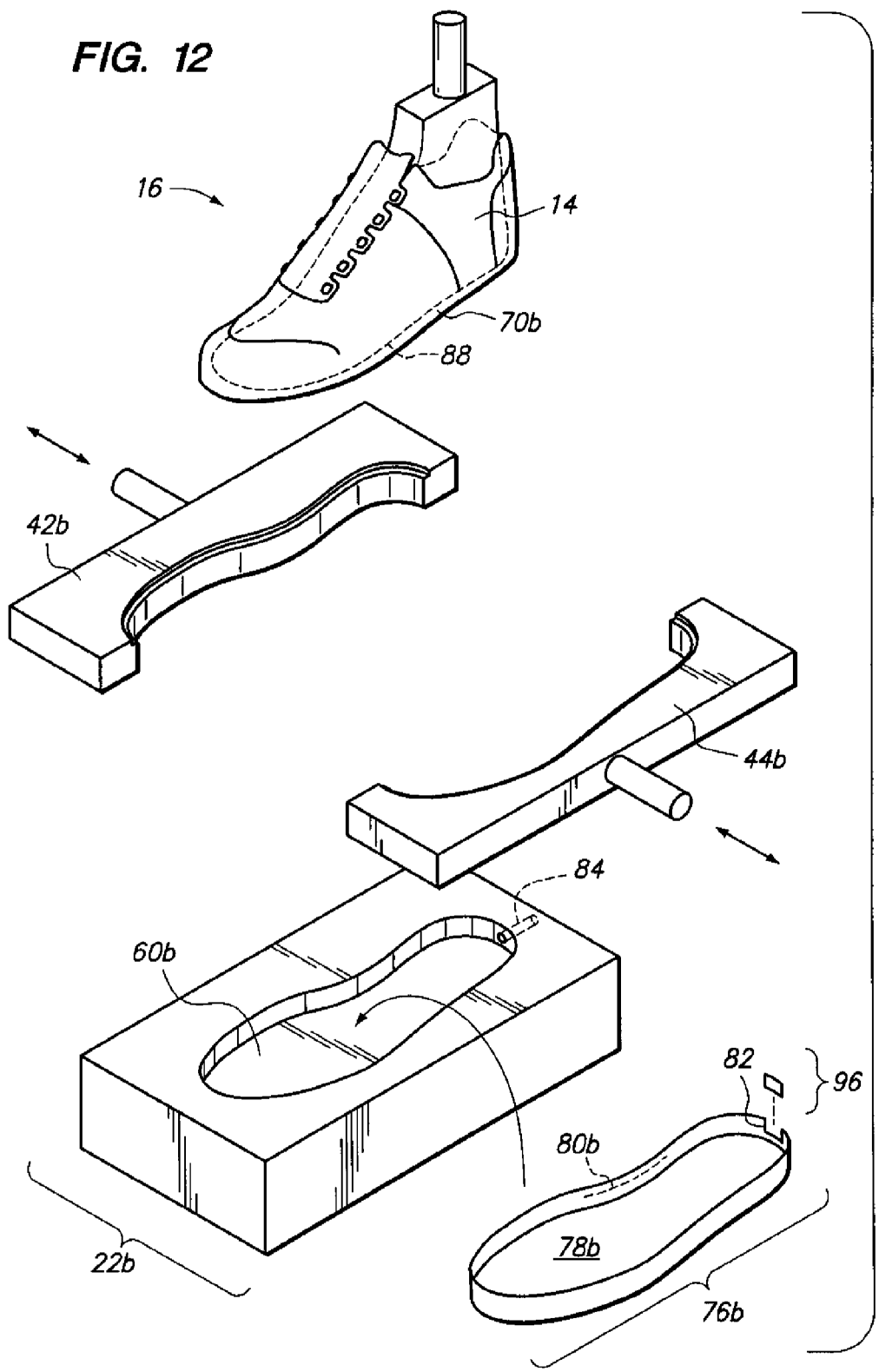
FIG. 12 is an illustration of an injection molding process for manufacturing a cupsole shoe.

Referring now to FIG. 12, an injection molding fixture for a cupsole is shown. In particular, the cupsole 76b may have a notch 82. When the cupsole 76b is inserted into the cavity 60b, the notch 82 is aligned to an injection port 84 through which polyurethane may be injected into or on the cupsole 76b at a later time.

An activatable adhesive may be applied (e.g., sprayed, brushed, etc.) to the interior surface 78b of the cupsole 76b. With the cupsole 76b disposed on the bottom plate 22b, the adhesive may be activated (e.g., flash activated or heat activated). After activation, the lasted upper 16 may be brought down over the cupsole 76b so that the bottom surface 26b of the lasted upper 16b and the cupsole 76b define a mold for the midsole 10. Thereafter, the first and second parts 42b, 44b may be traversed to the closed position so that the first and second parts 42b, 44b may press against the lip 80b of the cupsole 76b onto the bottom peripheral edge portion 70b of the lasted upper 16b, as described in relation to FIG. 11. Polyurethane is now injected into the injection port 84 to fill the cavity defined by the cupsole 76b and the bottom surface 26b of the lasted upper 16b. The polyurethane may be allowed to expand into the cavity 60. Any gas is out gassed through the thin fabric material 32 of the lasted upper 16b. The polyurethane is now attached (e.g., fused or permeated with the material 32) to the upper 14. The notch 82 may be plugged with a filler 96 by way of a post production process.

Figure 13:
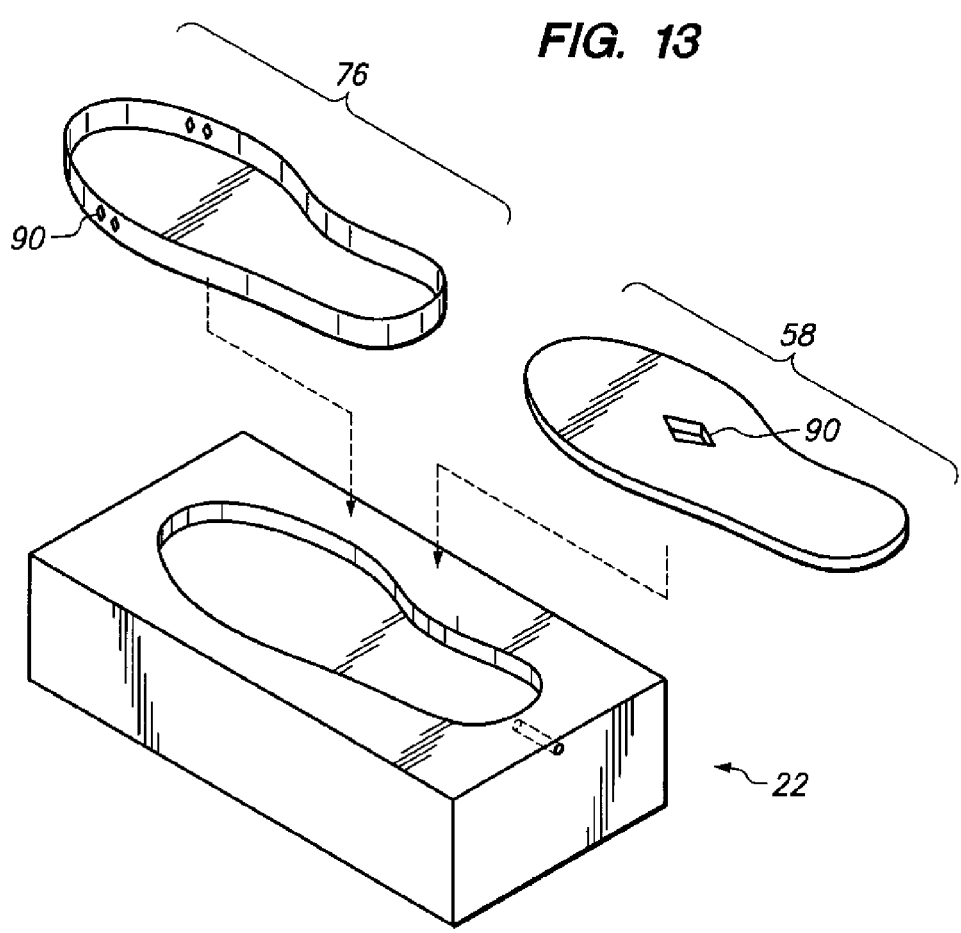
FIG. 13 illustrates apertures in an outsole and cupsole for purposes of flowing polyurethane through the outsole and cupsole for decorative as well as process purposes.

Referring now to FIG. 13, a bottom plate 22 is shown. The top plate 18, lasted upper 16 as well as other parts of the fixture 20 are not shown for the purposes of clarity. In manufacturing or building the vulc style footwear or the cupsole footwear, the outsole 58 or the cupsole 76 may have one or more apertures 90. The apertures 90 allow the polyurethane forming the midsole 10 to fill the aperture 90 in the cupsole 76 or the outsole 58. The polyurethane may be visible during normal use. The outsole and cupsole 76 with apertures 90 may be used in both the pouring method or the injection molding method described herein. Furthermore, the apertures 90 may provide for spewing of the polyurethane forming the midsole 10. By way of example and not limitation, the bottom plate 22 or the top plate 18 when appropriate may have recesses aligned to the apertures 90. The polyurethane forming the midsole 10 is expandable. The polyurethane may expand different amounts even though a regulated or predetermined amount of polyurethane is injected or poured. The excess amount of polyurethane may spew out of the apertures 90. The spewed out portion of the polyurethane may be cut off or finished as a post-production process.

Figure 14:
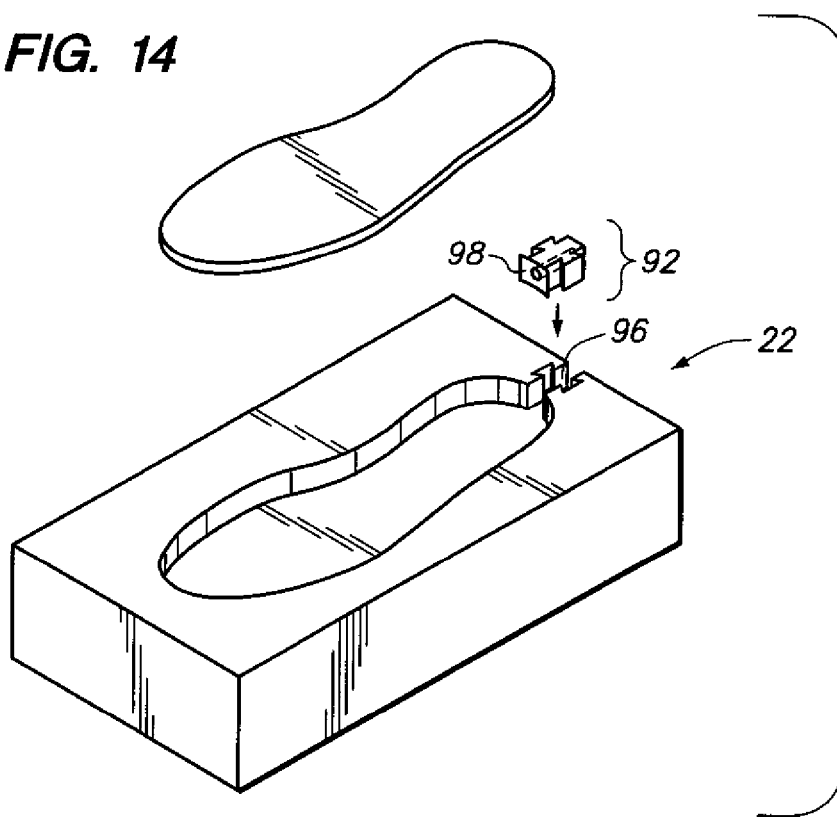
FIG. 14 is a perspective view of a fixture for providing an interchangeable back mold during manufacturing of a vulc style footwear.
Figure 15:
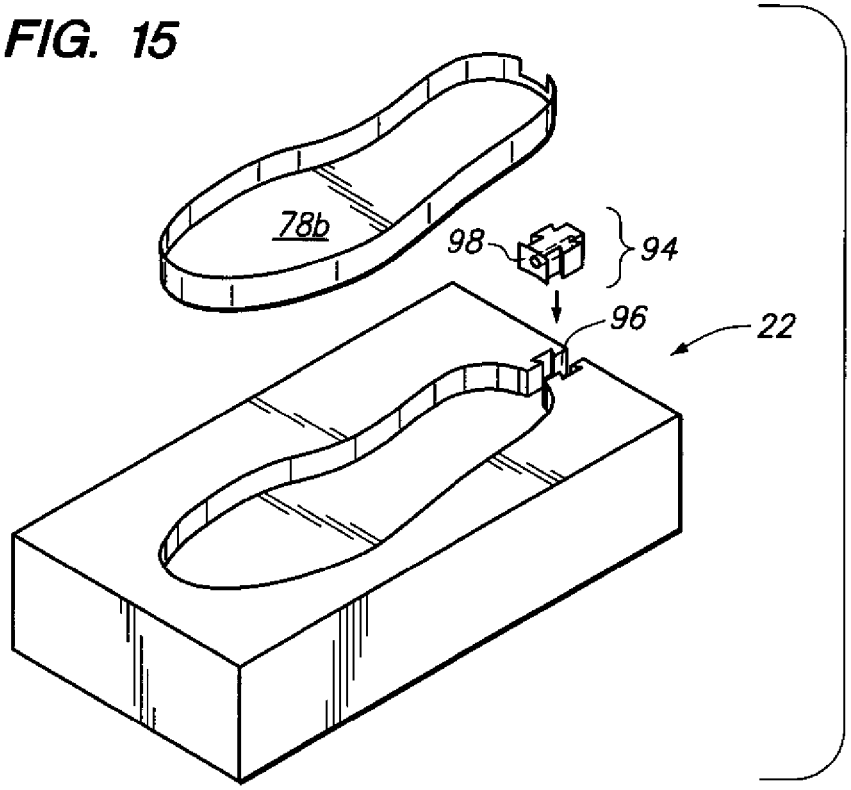
FIG. 15 is an illustration of a fixture having an interchangeable back mold during manufacturing of a cupsole footwear.

Referring now to FIGS. 14 and 15, a replaceable back mold 92, 94 is shown. The replaceable back mold 92, 94 may be inserted into a slot 96 formed in the bottom plate 22. The mold surface 98 of the replaceable back molds 92, 94 may have any configuration or aesthetic pattern. During manufacturing of multiple styles of footwear, the back molds 92, 94 may be interchanged as desired to match the style of footwear being manufactured.

As mentioned below, it is contemplated that the various aspects discussed herein may be applied to manufacturing footwear that has a unitary bottom sole (i.e., either a midsole or an outsole). The footwear will not have an outsole or a midsole. The bottom sole provides an interface between the wearer's feet and the support surface (e.g., floor or ground). The bottom sole may also provide for cushioning. In particular, instead of pouring the polyurethane or other suitable midsole material onto the cupsole or the outsole, the polyurethane is poured into the cavity 60 or injected into cavity 60b. The cupsole or outsole is not used. The bottom surface of the cavity 60 may have a tread pattern for the footwear. The poured or injected polyurethane is directly attached (i.e., fused) to the upper as discussed herein.

Figure 16:
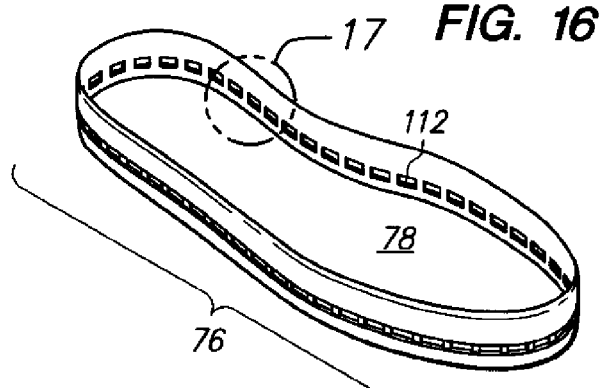
FIG. 16 is a perspective view of a cupsole.
Figure 17:
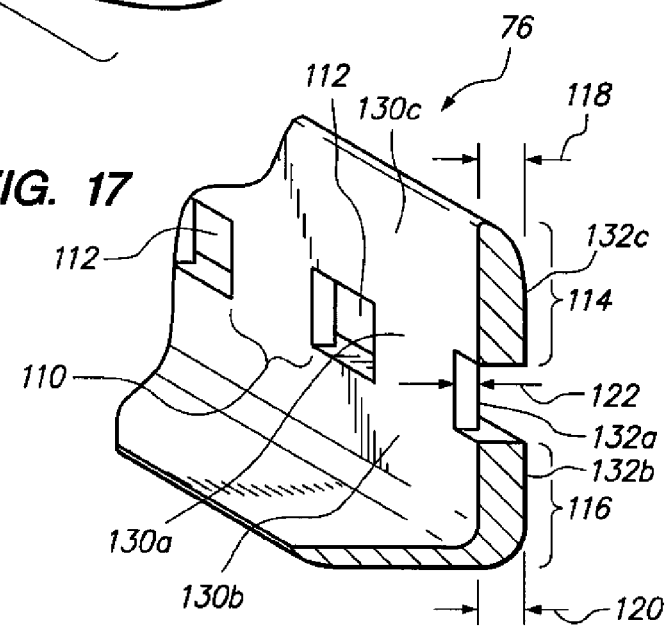
FIG. 17 is a cross sectional view of the cupsole shown in FIG. 16.
Figure 18:
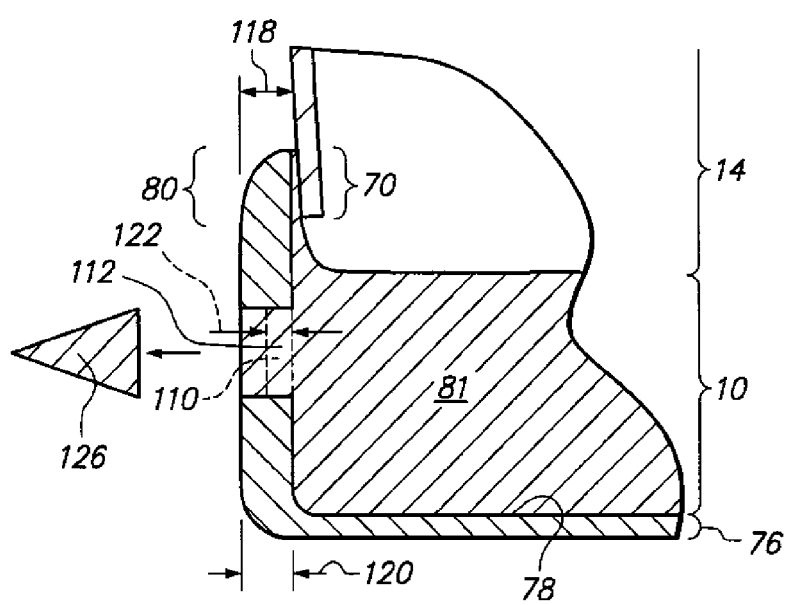
FIG. 18 is a cross sectional view of the cupsole shown in FIG. 16, midsole and upper.

Referring now to FIGS. 16-23, a different footwear manufacturing method for fabricating the vulc style footwear or cupsole style footwear is shown. In FIG. 16, a cupsole 76 is shown. The cupsole 76, which is shown more particularly in FIG. 17 has a plurality of posts 110 that circumscribe the entire periphery of the cupsole 76. The posts 110 form or define an aperture 112. The polyurethane or expandable midsole material flows through the aperture 112 and around the posts 110 to further provide a mechanical interlocking mechanism between the midsole and the cupsole 76, as shown in FIG. 18. Although the posts 110 and corresponding apertures 112 are shown as being formed about the entire periphery of the cupsole 76 in FIG. 16, it is also contemplated that the posts 110 and the apertures 112 may be formed about only a portion of the periphery of the cupsole 76. By way of example and not limitation, the posts 110 and the apertures 112 may be formed about the front toe portion, rear heel portion, left side portion, right side portion of the cupsole 76 as desired or needed. The apertures 112 allow the expanding polyurethane or midsole to surround the posts 110 and form a mechanical interlock between the cupsole 76 and the polyurethane after curing. In the skateboarding field where the front toe portion of the footwear experiences more stress due to the front portion of the footwear manipulating the skateboard, it may be required or preferred that only the front portion of the footwear has these alternating posts 110 and apertures 112 to further provide selective mechanical interlock or attachment between the midsole 10 and the cupsole 76 where needed.

The posts 110 are joined by an upper portion 114 and a lower portion 116. (see FIG. 17). As such, the upper portion 114, adjacent posts 110, and the lower portion 116 define each of the apertures 112. The upper and lower portions 114, 116 may have substantially equivalent widths 118, 120. Preferably, a width 122 of the posts 110 may be less than a width of both or at least one of the upper and lower portions 114, 116 of the cupsole 76. Also, the interior surfaces 130a, b, c of the post 110, lower portion 116, and outer portion 114 may form a smooth surface. The exterior surfaces 132a, b, c thereof may be staggered with the exterior surface 132a recessed in from the exterior surfaces 132b, c. The reason is to allow the expanding polyurethane to spew through the aperture 112 and surround the post 110, as shown in FIG. 18 for a mechanical interlock. The expanding polyurethane 81 forms the midsole 10 and may be attached to the upper 14 and the cupsole 76 in the same manner as previously described. In particular, the polyurethane 81 may be directly attached (i.e., fused and permeated) to the underside of the upper 14 and may be adhered to the interior surface 78 of the cupsole 76. Additionally, in this embodiment, the midsole 10 is further attached to the cupsole 76 by mechanical engagement in that the polyurethane 81 is spewed out of the aperture 112 and surrounds the exterior side of the post 110. The polyurethane 81 that spews out from adjacent apertures 112 are joined together to form a mechanical engagement between the cupsole 76 and the midsole 10.

As a further variation compared to the other embodiments discussed herein, the bottom peripheral portion 70 of the upper 14 and the lip 80 of the cupsole 76 are not adhered to each other. Rather, the expanding polyurethane 81 is allowed to spew upward and between the bottom peripheral edge portion 70 of the upper 14 and the lip 80 of the cupsole 76 as shown in FIG. 18. The polyurethane itself joins the bottom peripheral edge portion 70 and the lip 80 of the cupsole 76. The bottom peripheral portion 70 does not contact the lip 80.

Figure 8A:
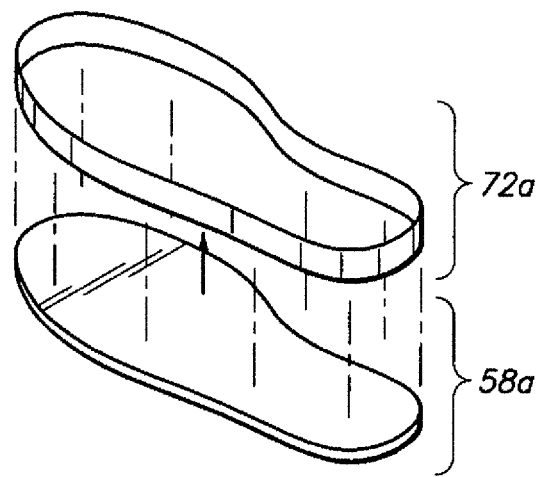
FIG. 8A is a perspective view of a pre-cured foxing being preattached to an outsole to form an outsole with a cavity.

The cupsole 76 described above is shown as a unitary part but it is also contemplated that the cupsole 76 may be fabricated in a two part form, as shown and described in relation to FIG. 8A. When the cupsole 76 is fabricated as the two part form, the apertures 112 and posts 110 are formed in the precured foxing 72a. The posts 110 and apertures 112 may be formed about the entire periphery or a select portion thereof, as needed or desired as discussed above. Additionally, the apertures 112 and posts 110 are shown and described as being formed in the vertical side wall of the cupsole 76 or the precured foxing 72a. However, it is also contemplated that apertures 112 may be formed in other areas such as the flat bottom outsole portion of the cupsole 76 and the outsole. The apertures 112 may be defined by posts 110 which may be thinner than the thickness of the outsole. Accordingly, an exterior surface of the posts 110 is recessed within the exterior surface of the outsole itself so that the polyurethane or midsole when uncured can flow out through the apertures 112 and around the posts 110 to form a mechanical bond or interlock to the outsole when cured. As such, the discussion of the apertures 112 and posts 110 are not limited to the specific embodiments disclosed herein but may be applicable to other configurations.

Figure 19:
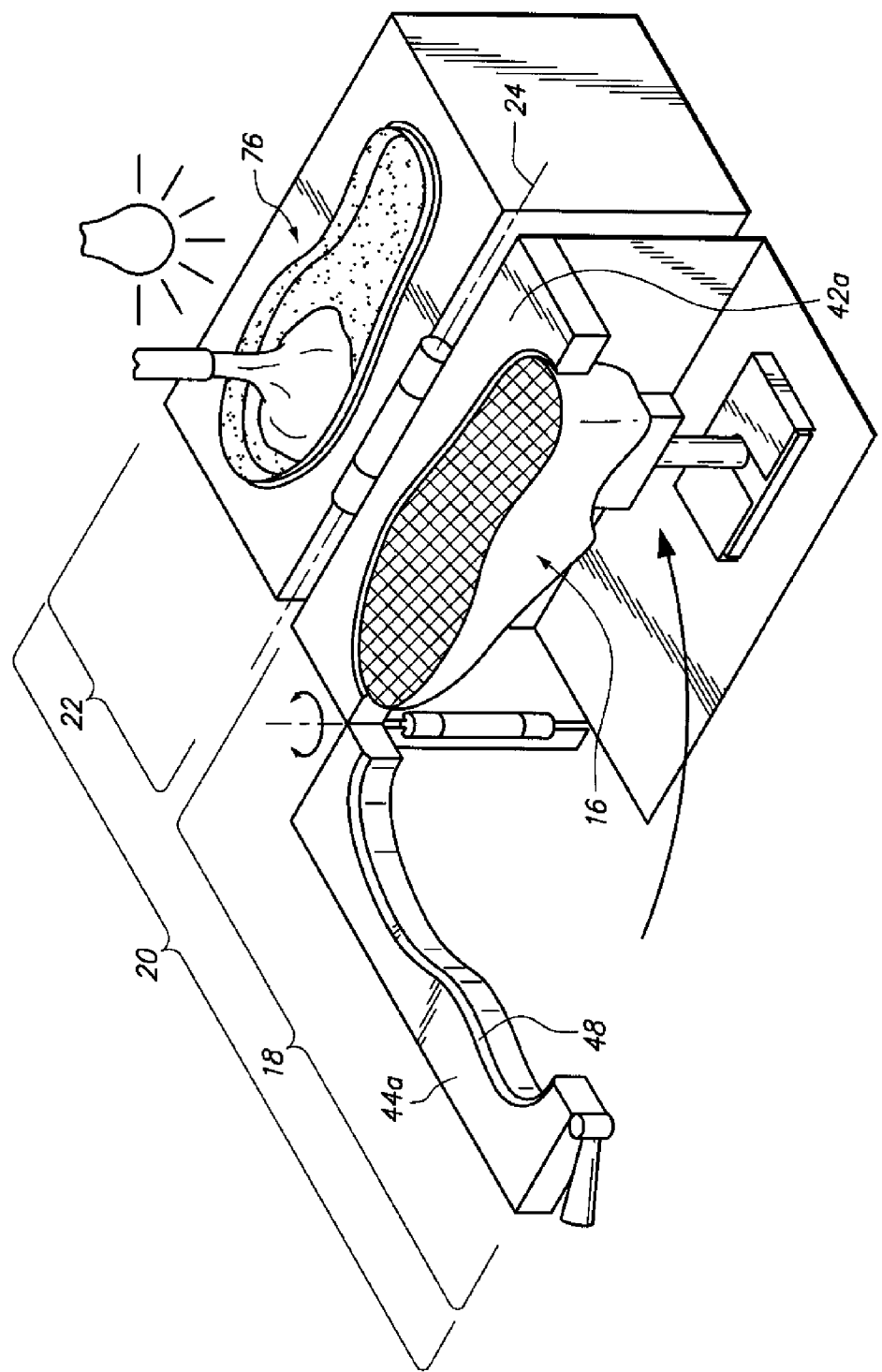
FIG. 19 is a perspective view of a footwear fixture for forming a footwear by pouring polyurethane into the cupsole shown in FIG. 16.
Figure 20:
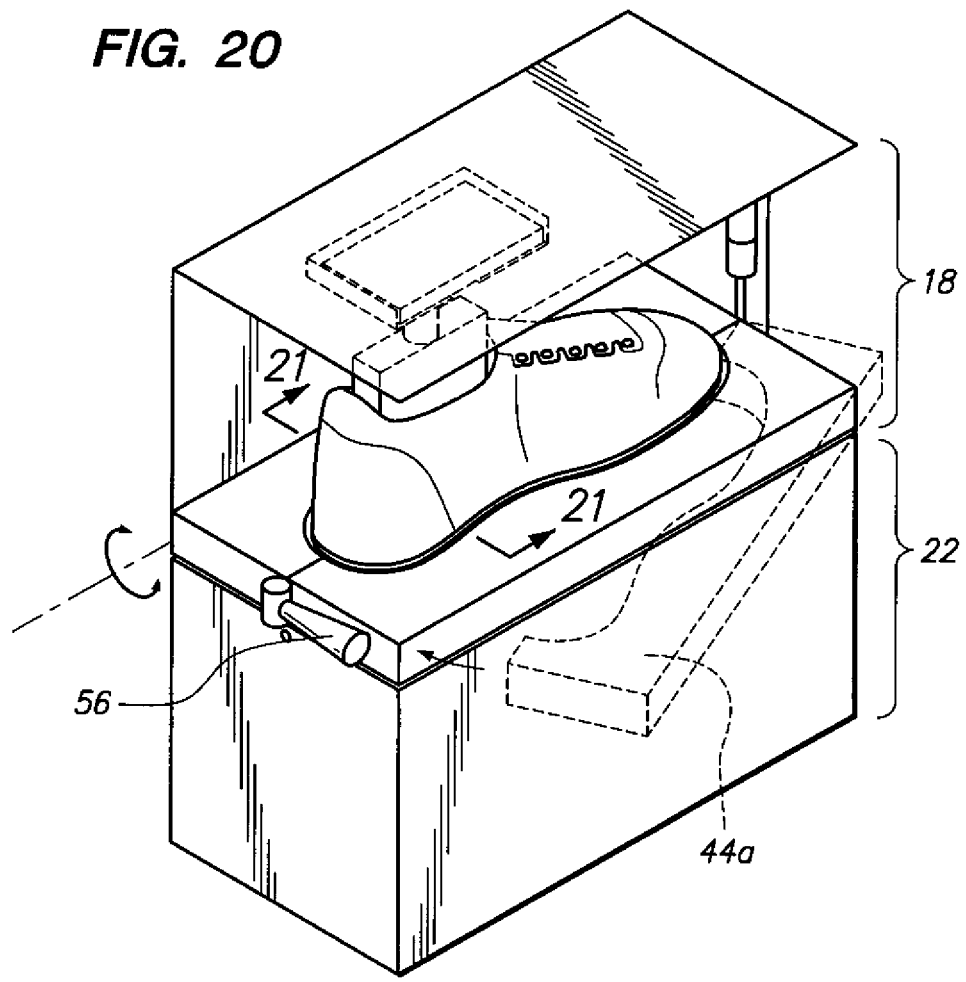
FIG. 20 is an illustration of the footwear fixture shown in FIG. 19 in a closed position after the polyurethane has been poured.
Figure 21:
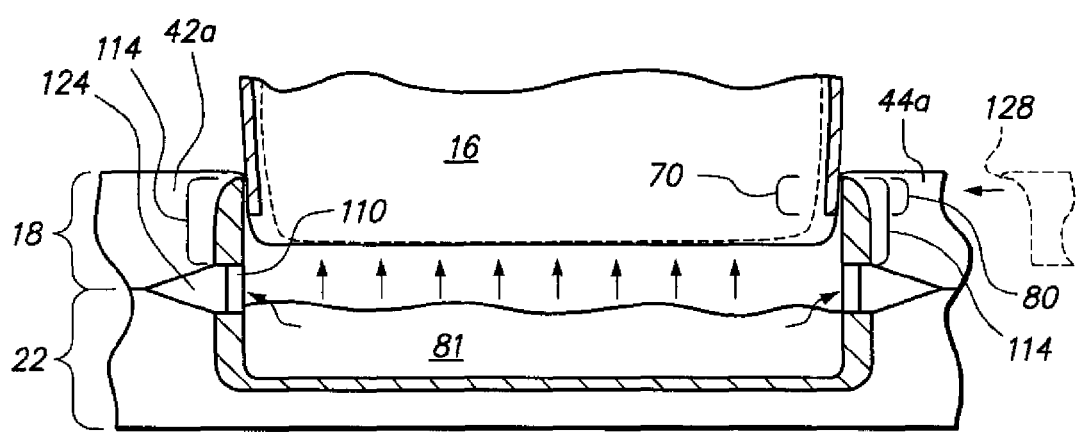
FIG. 21 is a cross sectional view of the footwear fixture and footwear shown in FIG. 20.

Referring now to FIG. 19, the cupsole 76 may be disposed within the bottom plate 22. The lasted upper 16 is fixed to the top plate 18 of the footwear fixture 20, as described herein. Prior to pouring polyurethane into the cupsole 76, PUR or an activatable adhesive may be applied to the interior surface 78 of the cupsole 76. The adhesive may be activated and polyurethane poured into the cupsole 76. Thereafter, the top plate 18 is rotated about axis 24 onto the bottom part, as shown in FIG. 20. If the polyurethane is poured immediately after application of the adhesive, then the adhesive does not need to be an activatable adhesive. Rather, PUR may be applied to the interior surface 78 of the cupsole 76. The polyurethane is then immediately poured onto the PUR. After the top and bottom plates 18, 22 are disposed on top of each other, the second part 44a is now traversed to the closed position and locked, as shown in FIG. 20. When the second part 44a is traversed to the closed position, as shown in FIG. 21, the inner periphery 48 (see FIG. 19) of the first and second parts 42a, 44a pushes against the upper portion 114 and the lasted upper 16. The lip 80 of the cupsole 76 does not contact the bottom peripheral edge portion 70 of the upper 14. When the polyurethane 81 is poured onto the cupsole 76, the polyurethane expands upward as shown in FIG. 21. The polyurethane is spewed upward between the lip 80 and the bottom peripheral portion 70, as shown in FIG. 18. The first and second parts 42a, 44a, and more particularly, the inner periphery 48 defines an edge 128 that pushes against the upper and provides a seal to prevent polyurethane from rising above the lip 80. The first and second parts 42a, 44a holds the lip 80 in position. Also, the polyurethane 81 expands out of the aperture and into a recess 124 defined by the top plate 18 and the bottom plate 22. Also, the polyurethane surrounds the posts 110 to create the mechanical attachment between the midsole 10 and the cupsole 76. After the polyurethane cures, a flashing 126 (see FIG. 18) is cut off from the exterior side of the cupsole 76.

Figure 22:
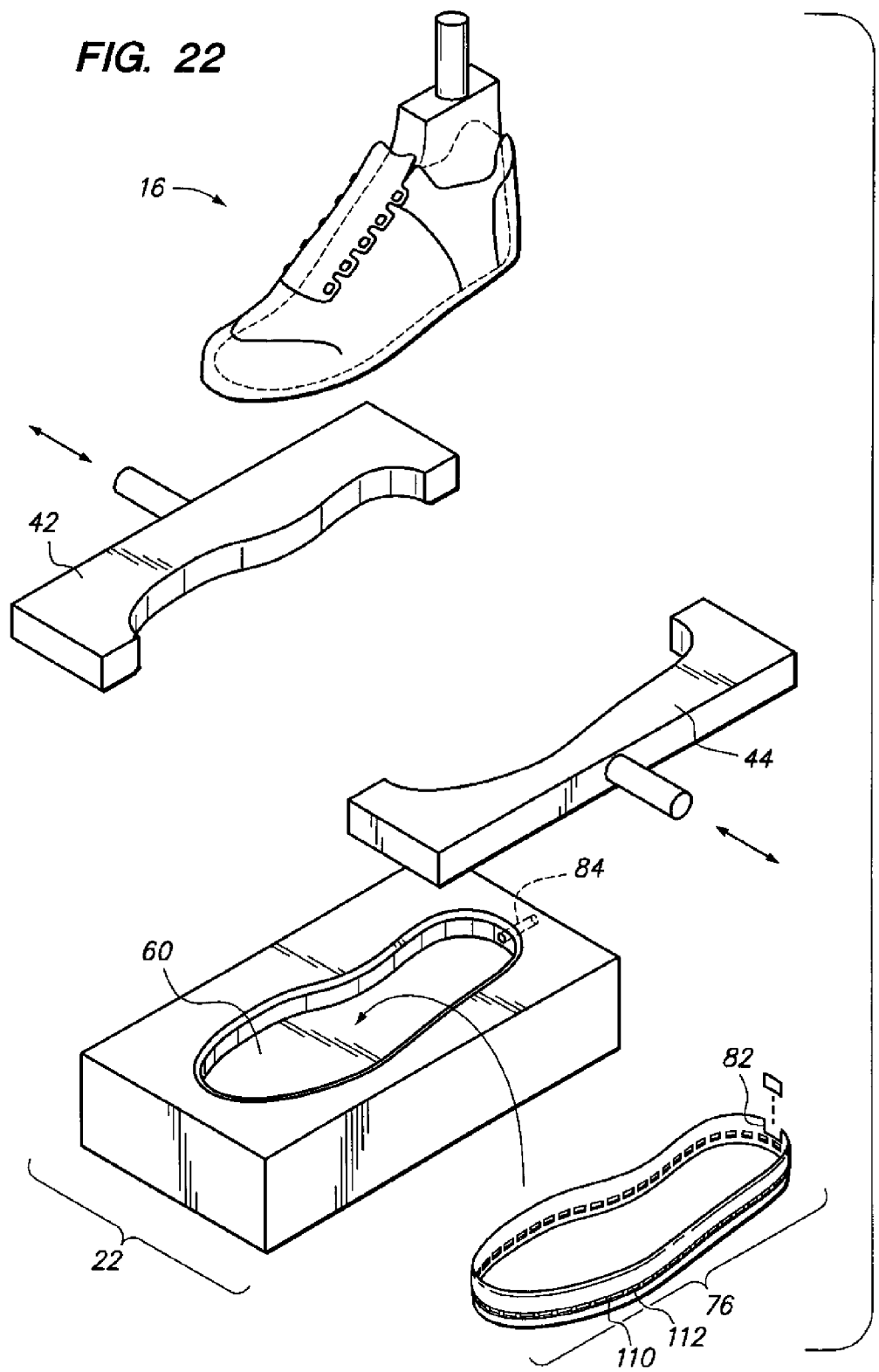
FIG. 22 is an exploded perspective view of an injection molding apparatus incorporating the cupsole shown in FIG. 16.
Figure 23:
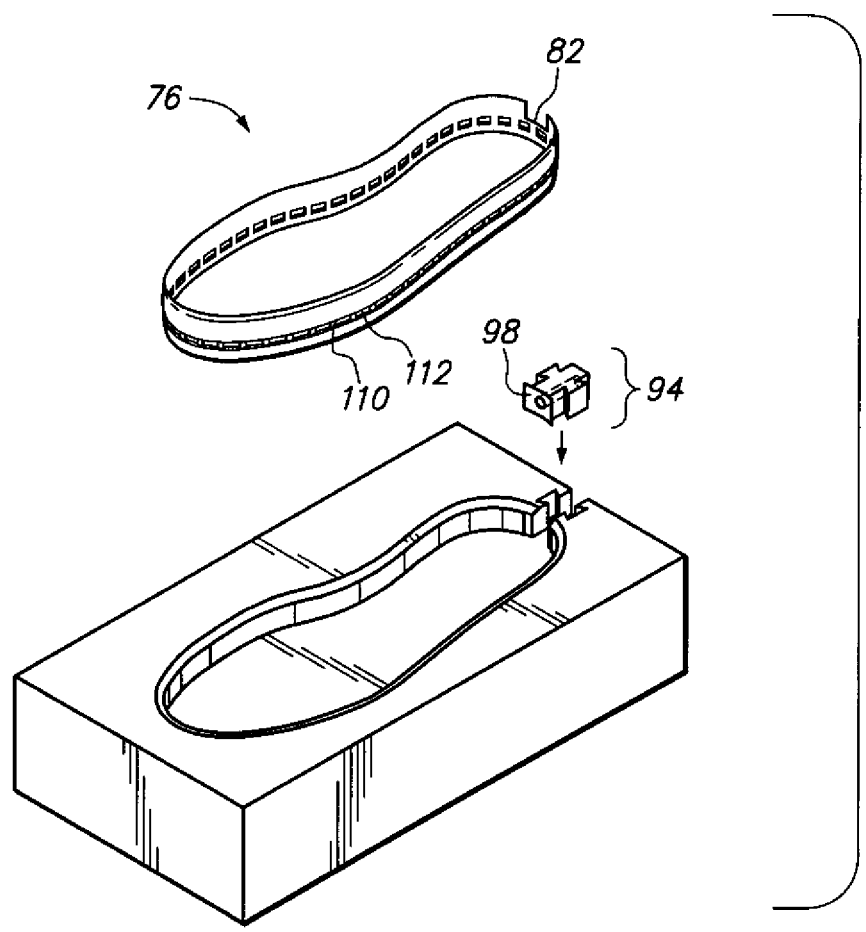
FIG. 23 is an exploded perspective view of a different embodiment of the injection molding apparatus shown in FIG. 22.

Referring now to FIGS. 22 and 23, the expandable material 81 may be injected between the cupsole 76 and the lasted upper 16 through injection port 84. The cupsole 76 is disposed within the cavity 60 of the bottom plate 22. The lasted upper 16 is aligned to the cupsole 76 and the first and second parts 42, 44 are brought together to hold the cupsole 76 and lasted upper 16 together. Expandable material 81 is injected between the cupsole 76 and the lasted upper 16 through the injection part 84 through the notch 82. The expandable material 81 (e.g., polyurethane) expands and spews through the apertures 112 and around the posts 110 so that the midsole 10 forms a mechanical interlock with the cupsole 76 upon curing of the midsole 10 or polyurethane. Referring now to FIG. 23, the cupsole 76 may have a notch 82 that is aligned to a mold surface 98 of a replaceable back mold 94. Different patterns may be formed on the mold surface 98 so as to provide an integrated aesthetic design with the material of the midsole 10. The replaceable back mold 94 has an injection port 84 that may be used to inject expandable material such as polyurethane between the cupsole 76 and the lasted upper 16 as described above in relation to FIG. 22.

In manufacturing the vulc style footwear or cupsole style footwear, low density polyurethane may be attached or bonded to the bottom of the upper. In this process, the low density polyurethane expands and contacts the bottom of the lasted upper. The polyurethane conforms to the contour of the polyurethane so that a different fixture is not required for each different last. Generally, as long as the top gage 88 of the upper 14 remains the same, the same fixture may be used for lasts having a different bottom surface since the midsole 10 conforms to the contour of the bottom of the last 28.

The footwear and methodology described herein was described in relation to polyurethane material, both high density for wear resistance or low resistance for cushioning purposes. It is also contemplated that other materials may be utilized in the method and the footwear such as any thermoset material (e.g., blown rubber, rubber, etc.) or thermoplastic (TPR, TPU, etc.). Also, various blends of polyurethane may be utilized. Additionally, the fixture 20 is shown as a hand operated fixture. However, other automatic and mechanical fixtures are also contemplated. The first and second parts 42, 44 of the top plate 18 do not necessarily need to rotate about pivot axis 46. Rather, the first and second parts 42, 44 may be hydraulically operated to come together or spread apart in automated machinery. Furthermore, the top plate 18, bottom plate 22 and the mid plate 62 may all work together in an automated machinery environment.

The above description is given by way of example, and not limitation. Given the above disclosure, one skilled in the art could devise variations that are within the scope and spirit of the invention disclosed herein, including various other types of fixtures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of manufacturing footwear, the method comprising the steps of:
    disposing an outsole on a first plate;
    disposing an upper in a second plate wherein the first and second plates are traversable between a closed position and an open position, the outsole and the upper defining a volume when the first and second plates are traversed to the closed position;
    disposing an amount of settable liquid on the top surface of the outsole wherein the amount of settable liquid is greater than the volume between the outsole and the upper;
    traversing the first and second plates to the closed position to define a mold for forming a midsole from the settable liquid;
    flowing an excess amount of the settable liquid through apertures formed in the outsole to surround posts that define the aperture for forming a mechanical interlock between the midsole and the outsole; and
    setting the settable liquid.

2. The method of claim 1 wherein the outsole is a cupsole.

3. The method of claim 2 wherein the cupsole is a unitary part or a two part outsole and pre-cured foxing.

4. The method of claim 1 wherein the settable liquid is fused to a bottom surface of the upper and adhered to the interior surface of the outsole.

5. The method of claim 1 further comprising the step of flowing the settable liquid between a lip of the outsole and a lower peripheral portion of the upper.

6. The method of claim 5 wherein the settable liquid is flowed between an entire periphery of the lip of the outsole and the lower peripheral portion of the upper.

7. A method of manufacturing footwear, the method comprising the steps of:
- disposing a cupsole on a first plate, the cupsole defining a top surface;
- disposing an upper in a second plate wherein the second plate is traversable to a first position with respect to the first plate, the cupsole and the upper defining an inner volume when the first and second plates are traversed to the closed position;
- disposing an amount of settable liquid on the top surface of the cupsole wherein the amount of settable liquid is greater than the inner volume;
- traversing the second plate to the first position with respect to the first plate so that a bottom surface of the upper is adjacent to the settable liquid on an opposite side from the cupsole the top surface of the cupsole and the bottom surface of the upper defines a mold for forming a midsole from the settable liquid;
- flowing an excess amount of the settable liquid through apertures formed in a sidewall of the cupsole;
- curing the settable liquid to a solid state to bond the midsole to the bottom surface of the upper.

8. The method of claim 7, further comprising the step of applying an adhesive to the upper surface of the cupsole to adhere the midsole to the cupsole.

9. The method of claim 7 wherein the second plate includes first and second parts that clamp around the lasted upper when the first and second parts are in a closed position, and the method further comprises the step of first applying adhesive to a lip of the cupsole, second traversing the second plate to the first position so that the lip of the cupsole is positioned between the upper and the first and second parts, and third traversing the first and second parts to the closed position to apply pressure on the lip of the cupsole to the upper.

10. The method of claim 9 further comprising the step of activating the applied adhesive.

11. The method of claim 10 wherein the activating step comprises the step of activating the applied adhesive with light or heat.

12. The method of claim 7 wherein the traversing step includes the step of rotating the first and second plates with respect to each other about a common pivot axis.

13. The method of claim 7 further comprising the step of lasting the upper and disposing the lasted upper in the second plate.

14. A method of manufacturing footwear, the method comprising the steps of:
- disposing a cupsole on a first plate, the cupsole defining a top surface;
- disposing a lasted upper in a second plate wherein the second plate is traversable to a first position with respect to the first plate, the cupsole and the lasted upper defining an inner volume;
- traversing the second plate to the first position with respect to the first plate so that a bottom surface of the lasted upper is adjacent the cupsole so as to define a mold for a midsole;
- injecting settable liquid between the bottom surface of the lasted upper and the cupsole in a volume greater than the inner volume;
- flowing the excess amount of settable liquid through apertures formed in the cupsole;
- curing the settable liquid to a solid state to form the midsole;
- attaching the settable liquid to the upper and the cupsole.

* * * * *